Aug. 19, 1947.   V. E. HAMILTON, JR   2,425,800
CABLE FOR REINFORCING PIPE DURING BENDING OPERATION
Filed Jan. 26, 1946
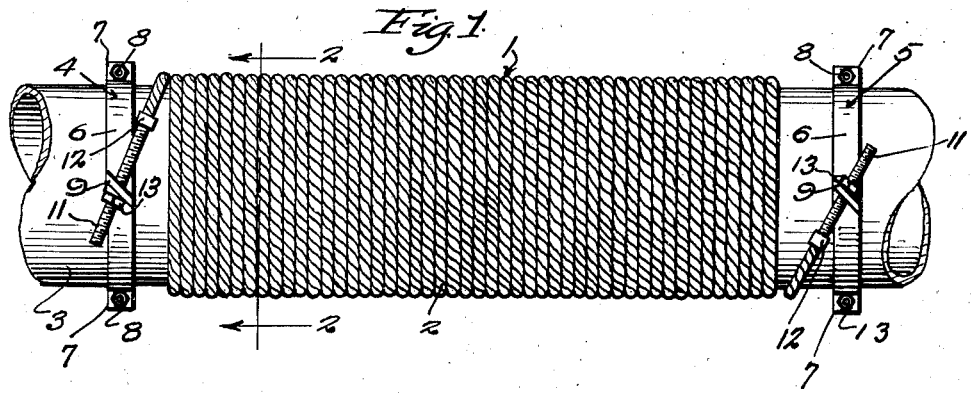
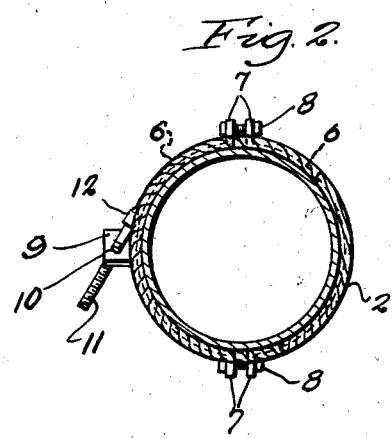
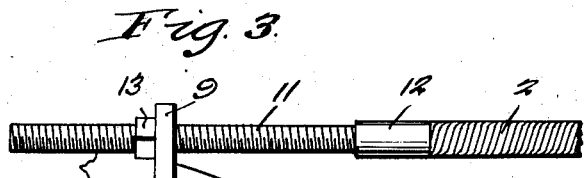
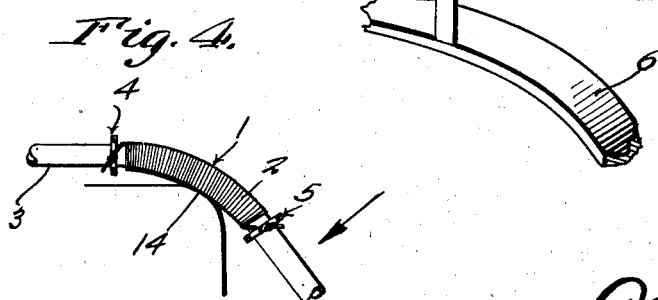
Inventor
VIVIAN E. HAMILTON, Jr.
By Clarence A. O'Brien
and Harvey B. Jacobson
Attorney Patented Aug. 19, 1947

2,425,800

UNITED STATES PATENT OFFICE 2,425,800

CABLE FOR REINFORCING PIPE DURING BENDING OPERATION

Vivian E. Hamilton, Jr., Shreveport, La.

Application January 26, 1946, Serial No. 643,811

1 Claim. (Cl. 153—32)

My invention relates to improvements in pipe reinforcing means for use in preventing distortion of pipes during bending of the same.

In bending pipes, particularly large diameter, thin wall pipe, such as is used in pipe lines for natural gas, the pipe, throughout the bend, tends to become distorted out of round into substantially elliptical shape, in cross section, and then to buckle inwardly so that it is restricted internally with the result that the flow of gas or other fluid therethrough is impeded. Also, such distorted pipe is susceptible to the development of leaks, particularly where buckled.

With the foregoing in mind, it is the primary object of my invention to provide means of simple form and inexpensive construction which may be easily and quickly applied to pipe, particularly such as large diameter, thin-wall pipe, to reinforce the same so as to obviate distortion of the pipe during bending, and regardless of the length of the section of the pipe throughout which the bend extends.

Another object is to provide means of the character and for the purpose above set forth which may be readily removed after the pipe is bent and used repeatedly, without developing defects, in other similar pipe-bending operations.

Other and subordinate objects also comprehended by my invention, together with the precise nature of my improvements, and the manifold advantages thereof, will be readily understood when the succeeding description and claim are read with reference to the drawing accompanying and forming part of this specification.

In said drawings:

Figure 1 is a fragmentary view in side elevation illustrating my invention applied to a pipe before the pipe is bent, Figure 2 is a view in transverse section taken on the line 2—2 of Figure 1, Figure 3 is a fragmentary view, partly in section, of one of the clamp sections, and the cable anchoring and tightening devices, drawn to an enlarged scale, and Figure 4 is a view in side elevation illustrating the pipe bent with my improved pipe reinforcing means applied, and drawn to a reduced scale.

Reference being had to the drawing by numerals, my improved pipe reinforcing means, in the preferred embodiment illustrated, comprises a wrapper 1 formed of a single length of cable 2, preferably of a material which will not stretch, such as steel, and which is helically wound around the section 3 of pipe to be bent so that the wrapper extends at each end well beyond the length of the bend to be subsequently formed and with the convolutions thereof contacting and, preferably, forming a single layer wrapper. In forming the wrapper 1, the convolutions of the cable 2 are drawn tight without, of course, imposing such pressure on the pipe section 3 that said section will be deformed.

At the opposite ends of the wrapper 1, devices are provided on the ends of the cable 2, and the pipe section 3, respectively, for anchoring said ends and tightening said cable, and which comprise the following.

A pair of clamps 4, 5 are circumposed on the pipe section 3 adjacent to each end of the wrapper 1. The clamps 4, 5 comprise, respectively, a pair of substantially semicircular band sections 6 with outstanding end ears 7 by means of which, and bolts 8, extended therethrough, said sections 6 are drawn together in clamping relation to the pipe section 3. An outstanding, oblique, keeper lug 9 is provided on one section 6 of each clamp 4, 5 with an aperture 10 therein. A threaded rod 11 is secured by a coupling 12 to each end of the cable 2. The rods 11 are extended through the apertures 10 and the ears 9 and suitably provided with nuts 13 for turning against the lugs 9 to feed the rods 11 through said apertures 10 and thereby tighten the wrapper 1.

The cable 2 is wound on the pipe section 3 to form the wrapper 1, preferably with one end anchored to one of the clamps 4 or 5, in the manner described, and the other end anchored to the other clamp when the wrapper 1 is completed. After the wrapper 1 is formed and the ends of the cable 2 anchored, the wrapper 1 may be tightened by means of the described devices.

The pipe section 3 may be bent in accordance with any of the usual procedures, for instance, as generally illustrated in Figure 4, by placing said section on a rest 14, and applying pressure against said section adjacent to one end of the wrapper 1 in the direction indicated by the arrow while said section 3 is suitably fixed adjacent to the other end of said wrapper.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the claim.

What I claim is:

Reinforcing means for a pipe section for preventing deformation of the section out of round while being bent comprising a wrapper adapted to be imposed upon said section along the portion to be bent and of greater length than said portion, and devices adapted for anchoring the ends of the wrapper to said section and operative to tighten said wrapper, said devices comprising a pair of ring clamps adapted to be circumposed on said section at the ends of the wrapper, respectively, and to which the ends of said wrapper are adjustably connected, the connections between the ends of the wrapper and said clamps comprising threaded rods on the ends of the wrapper extending tangentially across said clamps, and apertured lugs on said clamps through which said rods are extended and nuts on said rods, said lugs being oblique to the plane of said clamps for extension of said rods therethrough.

VIVIAN E. HAMILTON, Jr.

REFERENCES CITED

The following references are of record in the file of this patent:

UNITED STATES PATENTS

| Number | Name | Date |
|---|---|---|
| 2,335,038 | Bridges | Nov. 23, 1943 |
| 1,941,358 | Longfellow | Dec. 26, 1933 |
| 1,936,765 | Lawson | Nov. 28, 1933 |
| 174,609 | Wright | Mar. 7, 1876 |
| 1,514,412 | Wilkinson | Nov. 4, 1924 |
| 2,273,655 | Olsen | Feb. 17, 1942 |